(12) United States Patent
Zhang et al.

(10) Patent No.: US 8,208,700 B2
(45) Date of Patent: Jun. 26, 2012

(54) MASS SPICULES DETECTION AND TRACING FROM DIGITAL MAMMOGRAMS

(75) Inventors: Heidi Daoxian Zhang, Los Gatos, CA (US); Patrick Bernard Heffernan, Los Gatos, CA (US)

(73) Assignee: Three Palm Software, Los Gatos, CA (US)

( * ) Notice: Subject to any disclaimer, the term of this patent is extended or adjusted under 35 U.S.C. 154(b) by 832 days.

(21) Appl. No.: 12/119,295

(22) Filed: May 12, 2008

(65) Prior Publication Data

US 2008/0285825 A1    Nov. 20, 2008

Related U.S. Application Data

(60) Provisional application No. 60/930,131, filed on May 15, 2007.

(51) Int. Cl.
*G06K 9/00* (2006.01)
*G06K 9/34* (2006.01)
*A61B 6/04* (2006.01)

(52) U.S. Cl. .......................... 382/128; 382/173; 378/37

(58) Field of Classification Search .................. 382/173, 382/128–132; 378/37
See application file for complete search history.

(56) References Cited

U.S. PATENT DOCUMENTS

| 5,815,591 | A | | 9/1998 | Roehrig et al. | |
| 5,970,164 | A | * | 10/1999 | Bamberger et al. | ........... 382/128 |
| 6,246,782 | B1 | * | 6/2001 | Shapiro et al. | ................ 382/128 |
| 7,646,902 | B2 | * | 1/2010 | Chan et al. | .................... 382/128 |
| 8,086,002 | B2 | | 12/2011 | Zhang et al. | |
| 2007/0211930 | A1 | * | 9/2007 | Dolwick et al. | .............. 382/132 |

* cited by examiner

*Primary Examiner* — Andrew W Johns
*Assistant Examiner* — Shefali Goradia
(74) *Attorney, Agent, or Firm* — Haynes and Boone, LLP

(57) ABSTRACT

The present invention provides an algorithm to detect and trace the spicules of a mass density in digital mammograms using an adaptive threshold edge algorithm and a flood-fill segmentation algorithm. Elongation criteria are used to remove false edges that do not radiate from a central mass margin. The algorithm works on a central mass border and spicules feature map that contains a subset of the pixels from the source image, so processing time is fast enough for use in a mammography CAD server and for real-time computation within a digital mammography workstation.

13 Claims, 4 Drawing Sheets

MASS SPICULES DETECTION AND TRACING FROM DIGITAL MAMMOGRAMS

RELATED APPLICATIONS

The present application claims priority to U.S. Provisional Application 60/930,131, filed on May 15, 2007, which is herein incorporated by reference in its entirety.

BACKGROUND

1. Technical Field

The present invention relates generally to the field of medical imaging systems. Particularly, the present invention relates to an algorithm for mass spicules detection, tracing and display from digital mammography images in conjunction with a mammography CAD (Computer-aided detection) server and a digital mammography workstation.

2. Discussion of Related Art

Mass spicules are visible as lines radiating from the margin of a mass. Most breast carcinomas have a mammographic appearance with such a spiculated structure, so it is an important sign used by radiologists when making a cancer diagnosis. The quality of automatic spicules detection and tracing has a direct impact on the detection performance of a CAD system. Displaying this information on a CAD workstation helps radiologists understand the CAD markers, and is especially important to help the radiologist dismiss false positive markers, and to enforce a positive finding. Although current CAD systems may display relevant information, (see, e.g., U.S. Pat. No. 5,815,591 September 1998 Roehrig, Romsdahl and Zhang "Method and apparatus for fast detection of spiculated lesions in digital mammograms"), no current CAD systems or workstations display computer generated spicules traces.

Therefore, there is a need for better systems for mass spicules detection and tracing from digital mammograms.

SUMMARY

Some embodiments according to the present invention provide for a central mass segmentation and an associated spicules trace in digital mammograms. A method includes selecting mass density candidates to obtain the regions of interest (ROIs); pre-processing each candidate to obtain a central mass segmentation and a corresponding spicules feature map; tracing a central mass border and associated spicules; and displaying a result or using the result in a CAD server.

These and other embodiments are further described below with respect to the following paragraphs.

DETAILED DESCRIPTION OF THE INVENTION

Some embodiments of the current invention provide a system and method to detect and trace the spicules in digital mammograms using an adaptive threshold to obtain a spicules feature map which is followed by a flood-fill segmentation algorithm to obtain the spicules tracing. Elongation criteria are used to remove false edges that do not radiate from the central mass margin. The method works on a central mass border and spicules feature map that contains a subset of the entire image, so processing time can be fast, allowing use in a mammography CAD server, and real-time computation within a digital mammography workstation. Methods according to the present invention can also be applied to breast ultrasound and breast MRI images to obtain stellar margin tracings.

In some embodiments of the present invention, there are two main steps used to obtain the spicules from a mass candidate ROI (region of interest): (1) pre-process the ROI to obtain a central mass segmentation and spicules feature map; (2) region grow from the central mass border into the spicules feature map by a flood-fill segmentation algorithm to obtain individual spicules.

Figure 1:
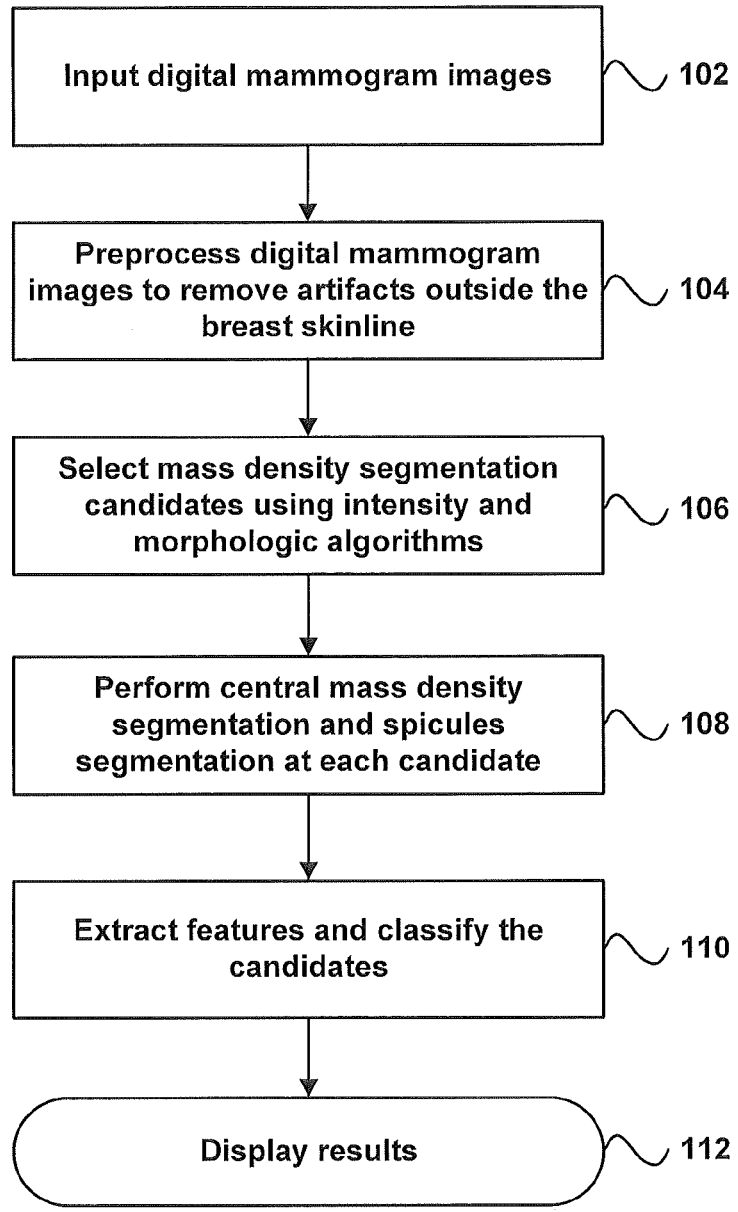
FIG. 1 shows a computer-aided detection and review system in which embodiments of the present invention may be utilized.

FIG. 1 shows how a method 100 according to the present invention can be used in a computer-aided detection and workstation review system. A set of 4 or more mammogram images from a mammography study is inputted to such system at step 102. Preprocessing is performed to remove artifacts outside the breast skinline as border of the breast tissue in step 104. Initial mass candidates are selected as region of interests (ROIs) for further processing in step 106. The candidate selection uses the integrated intensity and morphologic algorithms described in U.S. Ser. No. 12/099,785 Zhang and Heffernan "Algorithms for selecting mass density candidates from digital mammograms". The central mass density segmentation and spicules segmentation is performed at each mass candidate location in step 108. Based on the segmentation information, features are extracted and each candidate can be classified in step 110. The segmentation and classification results can then be displayed on a workstation review system in step 112.

Figure 2:
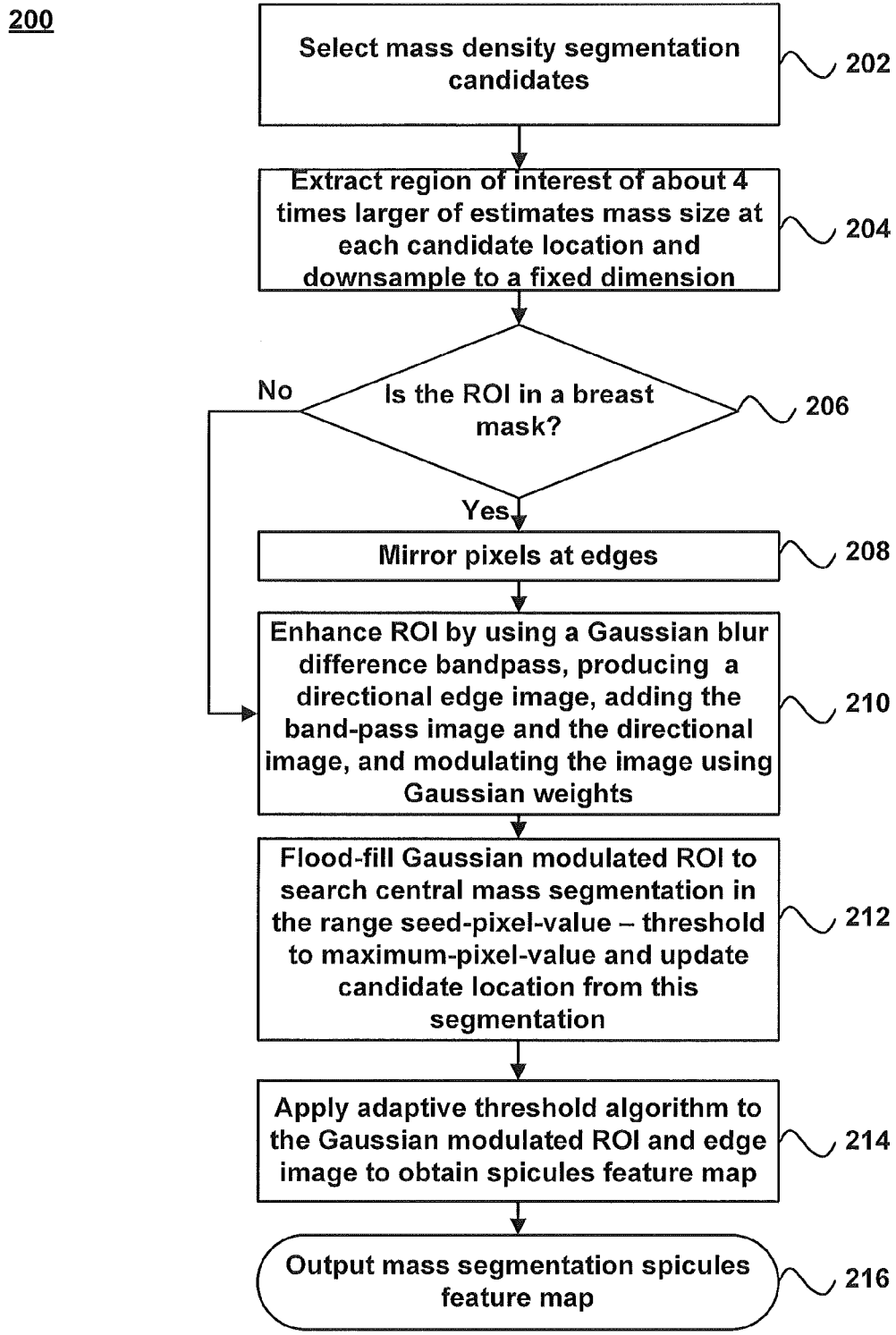
FIG. 2 illustrates pre-processing steps according to some embodiments of the present invention.

FIG. 2 shows a pre-processing method 200 performed as part of step 108 shown in FIG. 1. Pre-processing method 200 is performed to prepare for mass and its spicules segmentation. The original high resolution images and the breast skin line as masks are used in pre-processing method 200. Method 200 starts in step 202 from each mass candidate selected in step 106 of FIG. 1.

A ROI (region of interest) is extracted from the mass candidate in step 204. The size of the region is defined as 4 times of the estimated mass size obtained from an initial candidate calculation. The ROI is then down-sampled (or up-sampled) to a fixed dimension (such as, for example, 256×256) in step 204.

If the ROI is partially on the breast skin-line or chest-wall edges and, thus, in a breast mask as tested in step 206, the pixels outside the breast are filled up by mirroring the pixels inside the breast. Otherwise, method 200 proceeds to step 210.

In step 210, the fixed dimension ROI is enhanced by the following steps: (1) band-pass filtering using Gaussian blur difference with kernel size 96 and 8; (2) producing a directional edge image from the ROI, for example, using a 4 or 8 directional wavelet filter; (3) adding the band-pass image weighting by 4 and the directional edge image to form the enhanced ROI image; and (4) modulating the image with a "hat" shape modulator, such as Gaussian weights to obtain the enhanced ROI.

In step 212, method 200 uses a flood-fill segmentation technique to the enhanced ROI to search for central mass segmentation in the range between the seed-pixel-value (center of the candidate ROI) and the maximum-pixel-value within the ROI. Then the candidate location is updated to the centroid of the mass segmentation.

In step 214, method 200 applies an adaptive threshold algorithm to the enhanced ROI and the edge image to obtain the spicules feature map. The output of method 200 shown in FIG. 2 is the mass segmentation and the spicules feature map of step 216.

Figure 3:
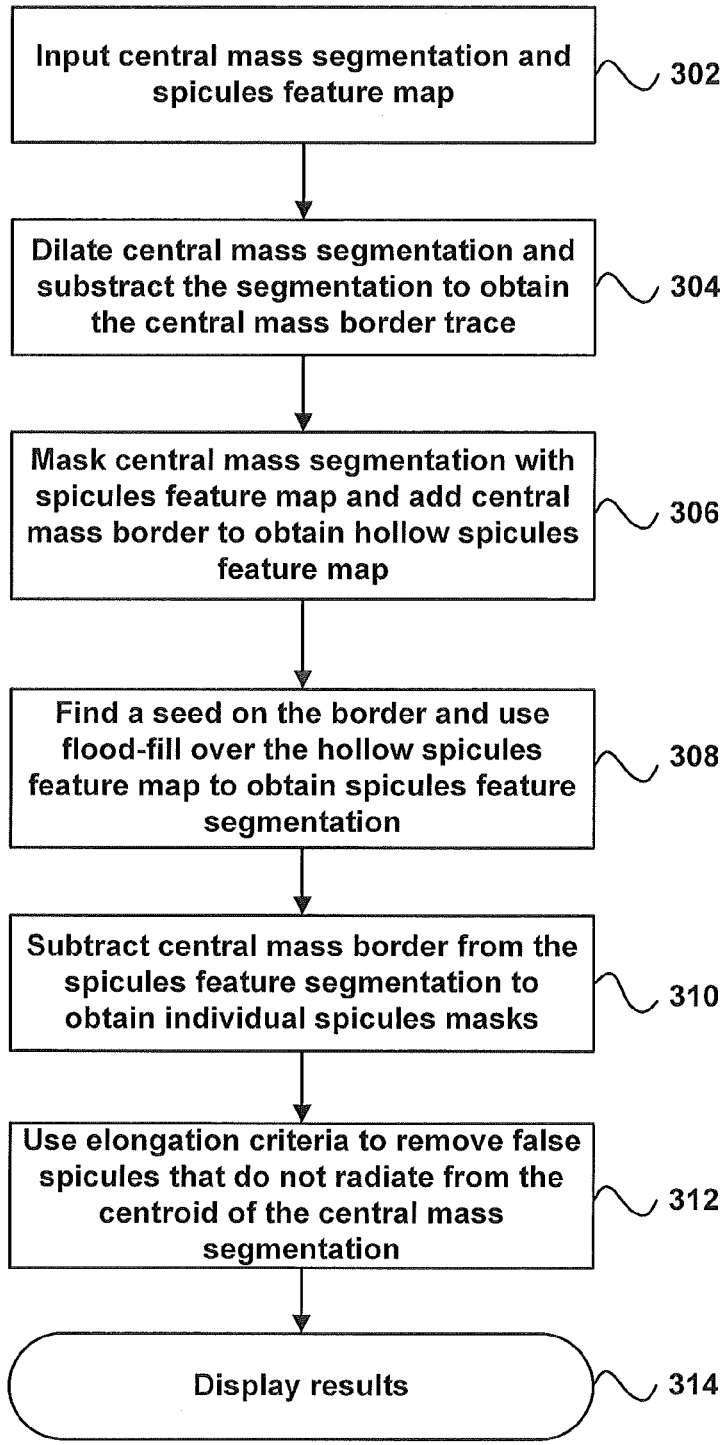
FIG. 3 shows a flowchart of the operations used to obtain spicules after pre-processing according to some embodiments of the present invention.

FIG. 3 shows a flowchart of the method 300 used to obtain the spicules after pre-processing as part of step 108 in FIG. 1. The central mass segmentation and the spicules feature map are used in this algorithm as inputs in step 302.

The central mass segmentation is dilated by 1 pixel in step 304. The central mass segmentation is subtracted from the dilated mass segmentation to obtain the central mass border trace in step 304.

In step 306, the spicules feature map is masked by central mass segmentation. The masked result is added to the central mass border to obtain the "hollow" spicules feature map.

In step 308, any pixel on the central mass border can be used as a seed, and the flood-fill algorithm is applied over the hollow spicules feature map to obtain the spicules feature segmentation.

In step 310, the central mass border trace is subtracted from the spicules feature segmentation to obtain the individual spicules segmentation masks.

In step 312, those false spicules that do not radiate from the centroid of the central mass segmentation are removed using elongation criteria.

In step 314, the resulted spicules segmentation mask can be displayed to aid radiologists in cancer diagnosis, or can be used to extract spicules feature for Computer-aided detection server.

Figure 4:
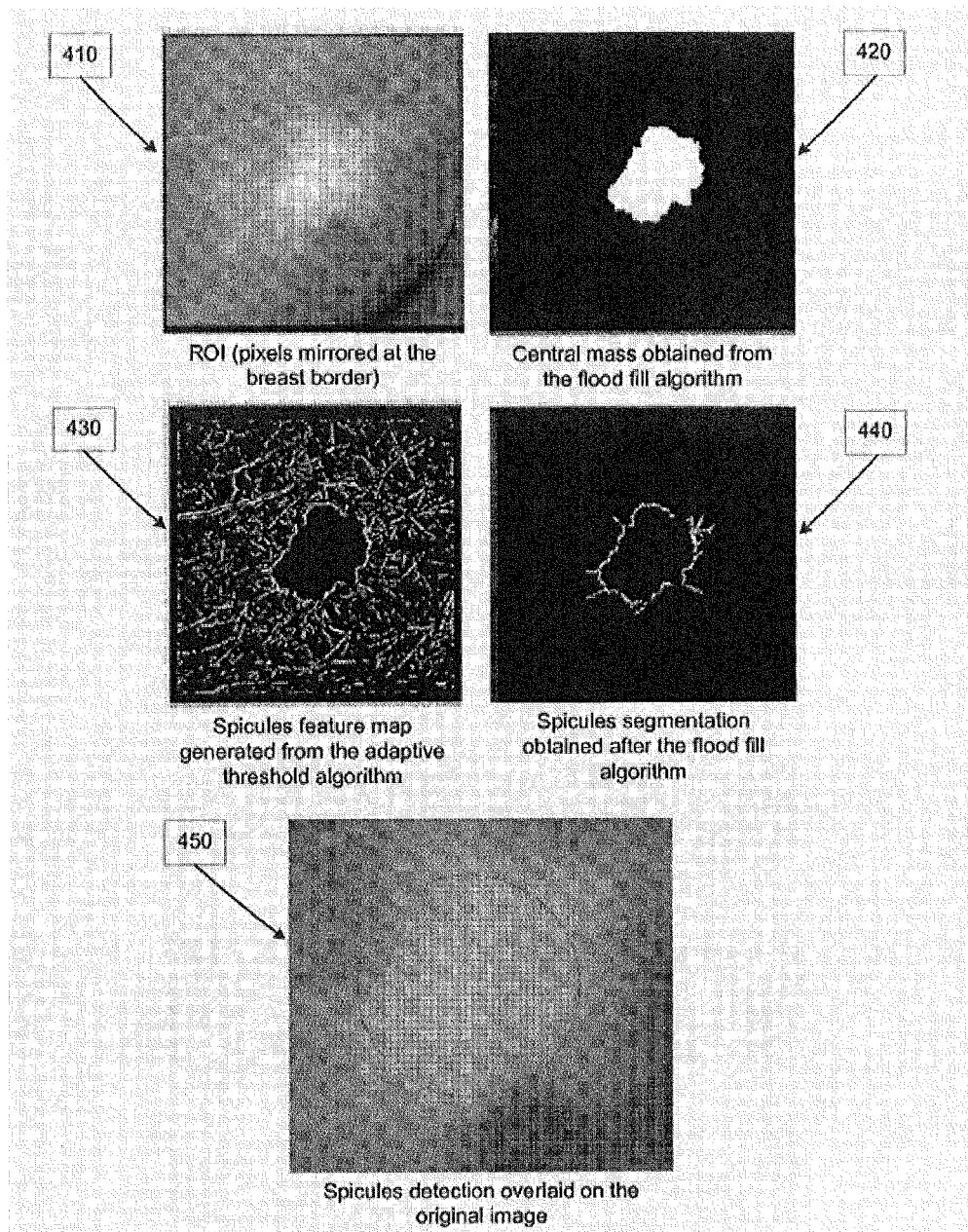
FIG. 4 shows some example results of utilizing algorithms described in FIGS. 2 and 3.

FIG. 4 shows an example of the results from the embodiments according to the present invention.

An initial mass candidate 410 is selected as region of interest for further processing. The size of the region is defined as 4 times of the estimated mass size obtained from initial candidate calculation. The ROI is then down-sampled to a fixed dimension (such as, 256×256). The pixels outside the breast are filled up by mirroring the pixels inside the breast.

The central mass segmentation 420 is obtained using method 200 illustrated in FIG. 2.

The central mass border and the spicules feature map 430 are generated using method 200 illustrated in FIG. 2.

The spicules tracing result 440 is obtained using method 300 illustrated in FIG. 3.

The tracing result is overlaid on the original image 450 to display on a review workstation to aid radiologists in making diagnosis.

The above examples of embodiments of the present invention are illustrative only and are not intended to be limiting. As such, the scope of the present disclosure is limited only by the following claims.

The invention claimed is:

1. A method of producing spicule traces from digital mammogram images, comprising:
    selecting mass density candidates to obtain regions of interest (ROIs);
    pre-processing each mass density candidate to obtain a central mass segmentation and a corresponding spicules features map, wherein pre-processing each mass density candidate comprises:
        extracting a region of interest at each mass density segmentation candidate location;
        resampling the extracted region to a fixed dimension;
        enhancing the extracted region to produce an enhanced image;
        performing flood-fill segmentation on the enhanced image to search for a central mass segmentation; and
        applying an adaptive threshold to the enhanced image and an edge image to produce the spicules features map; and
    tracing the obtained central mass segmentations and associated spicules to produce the spicule traces.

2. The method of claim 1, wherein the extracted region of interest is four times the estimated mass size at each mass density segmentation candidate location.

3. The method of claim 1, wherein resampling the extracted region comprises upsampling or downsampling the region to a dimension of 256 by 256 pixels.

4. The method of claim 1, wherein enhancing the extracted region comprises:
    bandpass filtering the extracted region using a Gaussian blur difference filter to produce a bandpass image;
    increasing a weighting of the bandpass image by a predetermined amount;
    adding the weighted bandpass image and the edge image, to produce a combined image; and
    modulating the combined image with a modulator and Gaussian weights to obtain the enhanced image.

5. The method of claim 4, wherein the predetermined amount is 4.

6. The method of claim 4, wherein the modulator is a "hat" shaped modulator.

7. The method of claim 1, wherein performing a flood-fill segmentation comprises performing a flood-fill in a range between a center of the enhanced image and a maximum pixel value within the enhanced image.

8. The method of claim 1, wherein tracing the obtained central mass segmentations and associated spicules comprises:
    dilating the obtained central mass segmentations by one pixel;
    subtracting the obtained central mass segmentations from the dilated mass segmentations to obtain a central mass border trace;
    masking the central mass segmentations with the spicules feature map;
    adding the masked result to the central mass border trace to obtain a hollow spicules feature map;
    selecting a pixel on the central mass border trace as a seed;
    applying a flood-fill over the hollow spicules feature map to obtain the spicules feature segmentation;
    subtracting the central mass border trace from the spicules feature segmentation to obtain individual spicules segmentation masks; and
    using elongation criteria to remove false spicules that doe not radiate from a centroid of the central mass segmentation.

9. The method of claim 1, wherein tracing the obtained central mass segmentations and associated spicules comprises:
    displaying the central mass segmentations and the corresponding spicules overlaid on the digital mammogram image.

10. The method of claim 1, further comprising:
    inputting the spicule traces into a computer-aided detection (CAD) server; and
    calculating the Breast Imaging-Reporting and Data System (BI-RADS) spiculated margin features.

11. The method of claim 1, wherein the spiculated margin features comprise at least one of a Boolean value indicating if spicules are present, a ratio of a diameter of a mass to a median length of the spicules, or an average angle of the spicules from a center of a mass.

12. A method of producing spicule traces from digital mammogram images, comprising:
   selecting mass density candidates to obtain regions of interest (ROIs);
   pre-processing each mass density candidate to obtain a central mass segmentation and a corresponding spicules features map, wherein pre-processing each mass density candidate comprises:
      extracting a region of interest at each mass density segmentation candidate location, the extracted region of interest being four times the estimated mass size at each mass density segmentation candidate location;
      resampling the extracted region to a fixed dimension, wherein resampling the extracted region comprises upsampling or downsampling the region to a dimension of 256 by 256 pixels;
      enhancing the extracted region to produce an enhanced image, wherein enhancing the extracted region comprises:
         bandpass filtering the extracted region using a Gaussian blur difference filter to produce a bandpass image;
         increasing a weighting of the bandpass image by a predetermined amount;
         adding the weighted bandpass image and the edge image, to produce a combined image; and
         modulating the combined image with a modulator and Gaussian weights to obtain the enhanced image;
      performing flood-fill segmentation on the enhanced image to search for a central mass segmentation, wherein performing a flood-fill segmentation comprises performing a flood-fill in a range between a center of the enhanced image and a maximum pixel value within the enhanced image; and
      applying an adaptive threshold to the enhanced image and an edge image to produce the spicules features map; and
   tracing the obtained central mass segmentations and associated spicules to produce the spicule traces.

13. A method of producing spicule traces from digital mammogram images, comprising:
   selecting mass density candidates to obtain regions of interest (ROIs);
   pre-processing each mass density candidate to obtain a central mass segmentation and a corresponding spicules features map; and
   tracing the obtained central mass segmentations and associated spicules to produce the spicule traces, wherein tracing the obtained central mass segmentations and associated spicules comprises:
      dilating the obtained central mass segmentations by one pixel;
      subtracting the obtained central mass segmentations from the dilated mass segmentations to obtain a central mass border trace;
      masking the central mass segmentations with the spicules feature map;
      adding the masked result to the central mass border trace to obtain a hollow spicules feature map;
      selecting a pixel on the central mass border trace as a seed;
      applying a flood-fill over the hollow spicules feature map to obtain the spicules feature segmentation;
      subtracting the central mass border trace from the spicules feature segmentation to obtain individual spicules segmentation masks; and
      using elongation criteria to remove false spicules that do not radiate from a centroid of the central mass segmentation.

* * * * *